US009820607B2

(12) United States Patent
Marschke et al.

(10) Patent No.: US 9,820,607 B2
(45) Date of Patent: Nov. 21, 2017

(54) APPARATUS AND METHOD FOR BREWING BEVERAGES

(71) Applicant: Spectrum Brands, Inc., Middleton, WI (US)

(72) Inventors: Karl Warner Marschke, Madison, WI (US); Kurt Ryan Rottier, Beaver Dam, WI (US); Daniele Rosati, Verona, WI (US); John S Reback, Madison, WI (US); Dave William Everett, Verona, WI (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 14/604,126

(22) Filed: Jan. 23, 2015

(65) Prior Publication Data

US 2015/0208856 A1 Jul. 30, 2015

Related U.S. Application Data

(60) Provisional application No. 61/931,312, filed on Jan. 24, 2014.

(51) Int. Cl.
  *A47J 31/04* (2006.01)
  *A47J 31/46* (2006.01)
  *A47J 31/06* (2006.01)
  *A47J 31/44* (2006.01)
  *A47J 31/057* (2006.01)

(52) U.S. Cl.
  CPC ............ *A47J 31/46* (2013.01); *A47J 31/057* (2013.01); *A47J 31/0631* (2013.01); *A47J 31/4475* (2013.01)

(58) Field of Classification Search
  CPC ...... A47J 31/46; A47J 31/057; A47J 31/4475; A47J 31/0631
  USPC .................. 99/300, 307, 315, 295
  See application file for complete search history.

(56) References Cited

U.S. PATENT DOCUMENTS

| 3,045,827 | A | * | 7/1962 | Hough | ................ | B01D 29/66 |
| | | | | | | 210/110 |
| 3,490,356 | A | | 1/1970 | Peterson et al. | | |
| 2003/0213370 | A1 | * | 11/2003 | Hammad | ............ | A47J 31/4478 |
| | | | | | | 99/300 |

FOREIGN PATENT DOCUMENTS

| DE | 20114328 U1 | 1/2002 |
| EP | 0555912 A1 | 8/1993 |
| WO | 02087399 A1 | 11/2002 |

OTHER PUBLICATIONS

Extended European Search Report for Application No. 15152282.8, dated Jun. 8, 2015, 8 pages.

\* cited by examiner

*Primary Examiner* — Phuong Nguyen
(74) *Attorney, Agent, or Firm* — Kagan Binder, PLLC

(57) ABSTRACT

Apparatus and methods are provided for brewing a beverage from precursor particulates. The apparatus comprises a liquid delivery system for delivering liquid into a brewing basket. The liquid delivery system comprises a showerhead disposed above at least a portion of the brewing basket. The showerhead has a plurality of outlet openings through which liquid flows outward from the showerhead into the brew basket. At least two of the outlet openings are oriented to direct the flow of liquid out of the showerhead at least in part transversely of the brew basket.

16 Claims, 9 Drawing Sheets

APPARATUS AND METHOD FOR BREWING BEVERAGES

CROSS REFERENCE TO RELATED APPLICATIONS

This patent application relates to and claims priority to U.S. provisional patent application Ser. No. 61/931,312 filed Jan. 24, 2014, which is hereby incorporated by reference in its entirety.

BACKGROUND

The field of the disclosure relates generally to apparatus and methods for brewing beverages from precursor particulates, and more particularly to apparatus and methods for distributing liquid to the brew basket of such apparatus.

Beverages brewers for making hot beverages such as coffee or tea typically have a brew basket into which precursor particulates such as ground coffee or tea leaves are loaded (e.g., loosely, contained in a filter bag or pod, or other manner). The brewer also includes a liquid delivery system having a heater, such as a CALROD heater or other commonly used heating arrangement, and a reservoir containing liquid (e.g., water) to be heated by the heater and used in brewing the beverage. In some conventional brewers, a riser tube, or up tube, directs heated liquid from the heater to a showerhead that is positionable over the brew basket where the liquid exits the showerhead and flows into the brew basket for contact with the precursor particulates. Existing showerheads typically include a large chamber with one or more outlet openings in the bottom of the chamber so that liquid flows into the large chamber and then vertically downward through the outlet openings.

In such an arrangement, an undesired amount of thermal energy is typically lost from the heated liquid as is flows into contact with a relatively large surface area of material in flowing along the liquid delivery system, including into the relatively large showerhead chamber. Additionally, in directing the liquid to exit the showerhead vertically downward, localized or otherwise relatively uneven distribution of the liquid onto the precursor particulates occurs. For example, irrespective of the flow rate of liquid into and out of the showerhead, the liquid flows straight downward onto the same spot within the brew basket.

Accordingly, there is a need for a beverage brewer and in particular a showerhead for such a brewer, that reduces thermal loss (e.g., so as to deliver hotter liquid to the brew basket and/or to speed up brewing time), and facilitates a uniform distribution of heated liquid from the showerhead onto the precursor particulates in the brew basket.

BRIEF DESCRIPTION

In one aspect, a beverage brewing apparatus for brewing a beverage from precursor particulates is provided. The apparatus comprises a brewing basket configured to receive precursor particulates therein. The apparatus also comprises a liquid delivery system for delivering liquid into the brewing basket. The liquid delivery system comprises a showerhead disposed above at least a portion of the brewing basket. The showerhead comprises a plurality of outlet openings where at least one of the outlet openings is oriented such that liquid exits the at least one of the outlet openings other than straight downward from the showerhead.

In another aspect, a beverage brewing apparatus for brewing a beverage from precursor particulates is provided. The apparatus comprises a brewing basket configured to receive precursor particulates therein. The apparatus also comprises a liquid delivery system for delivering liquid into the brewing basket. The liquid delivery system comprises a showerhead disposed above at least a portion of the brewing basket. The showerhead has a plurality of outlet openings through which liquid flows outward from the showerhead into the brew basket. At least two of the outlet openings being oriented to direct the flow of liquid out of the showerhead at least in part transversely of the brew basket.

In yet another aspect, a method of brewing a beverage from precursor particulates is provided. The method comprises loading precursor particulates into a brewing basket. The method also comprises delivering liquid in a flow direction through a showerhead disposed above at least a portion of the brew basket. The method further comprises directing liquid to flow out of the showerhead through a plurality of outlet openings of the showerhead into the brew basket for flow over the precursor particulates. At least one of the outlet openings being oriented to direct liquid out of the showerhead other than vertically downward into the brew basket.

DRAWINGS

Corresponding reference characters indicate corresponding parts throughout the several views of the drawings.

DETAILED DESCRIPTION

Figure 1:
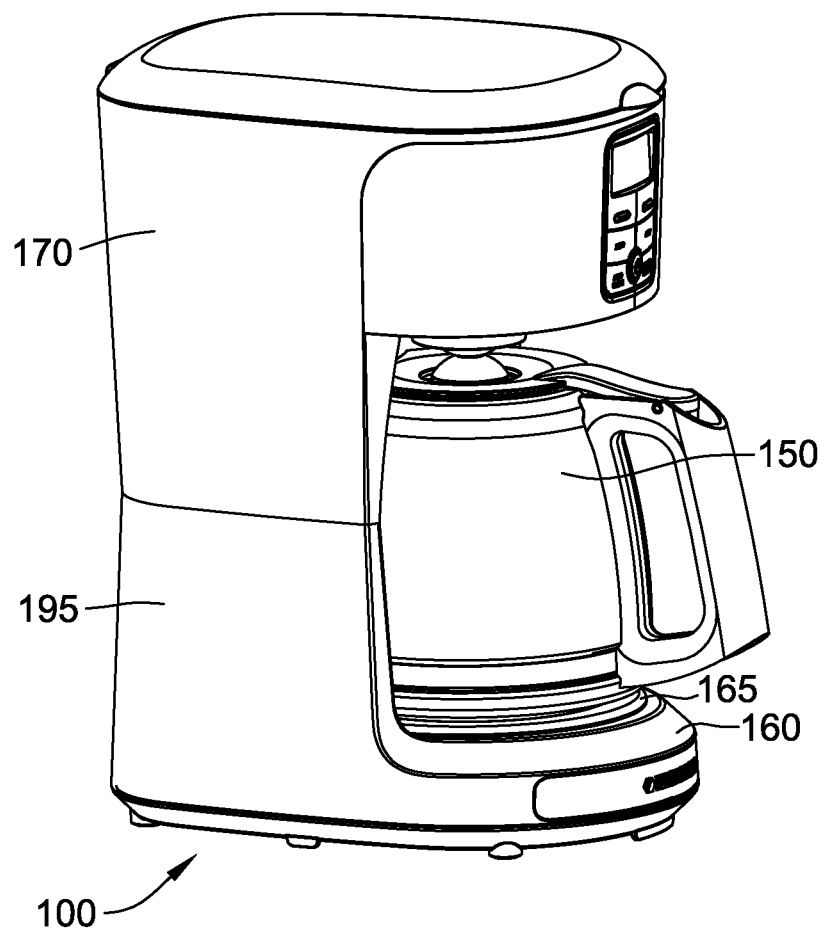
FIG. 1 is a perspective view of one embodiment of an apparatus for brewing beverages.
Figure 2:
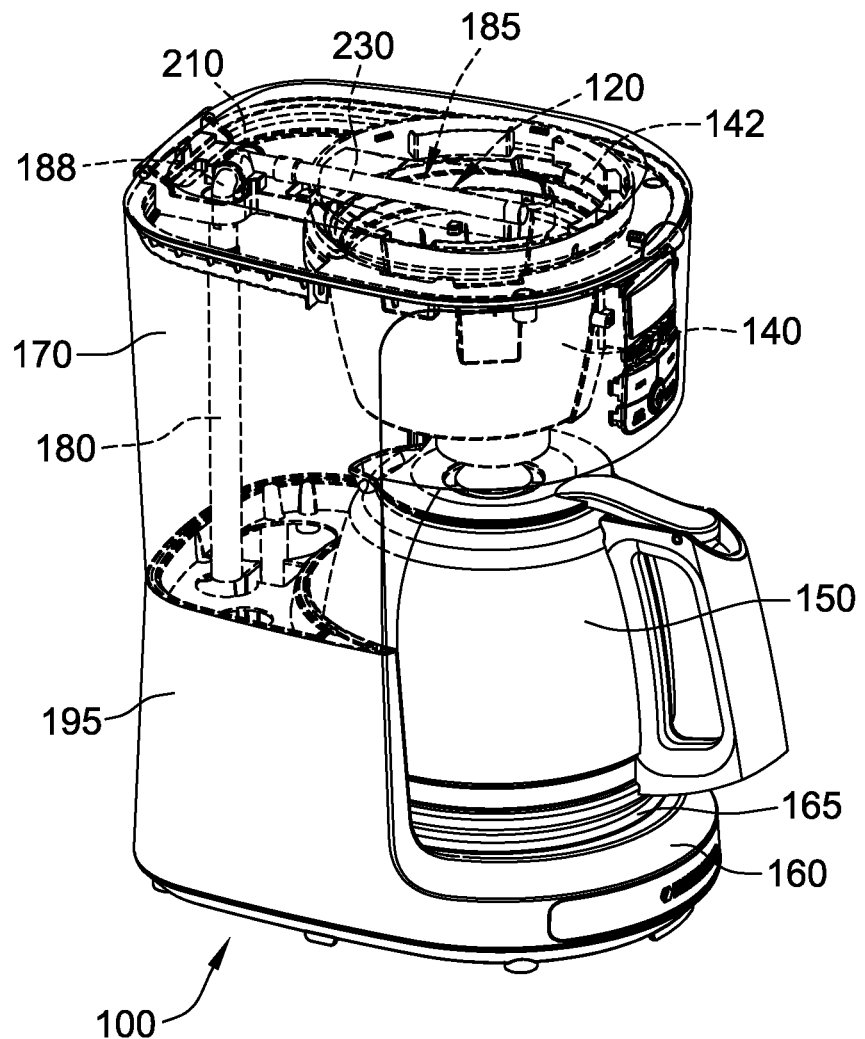
FIG. 2 is a perspective view similar to FIG. 1 with various components rendered transparent to illustrate internal components of the apparatus.

With reference now to the drawings, and in particular to FIGS. 1 and 2, one embodiment of an apparatus for brewing beverages from precursor particulates is schematically illustrated and generally indicated at 100. The illustrated apparatus is suitably configured for brewing hot beverages such as coffee or tea from precursor particulates such as ground coffee beans or tea leaves. It is understood, however, that in other embodiments the apparatus 100 and the various components thereof may be configured and/or used for making other beverages, and that the precursor may be other than in the form of particulates (e.g., liquid, large solid material, etc.) and remain within the scope of this invention.

The illustrated apparatus 100 comprises a brew basket 140 supportable by suitable support structure of the apparatus. The brew basket 140 may be removable from the apparatus 100 for loading precursor particulates therein, for emptying used particulates and for cleaning the basket. In other embodiments, the brew basket 140 may be moveable relative to the support structure for loading and emptying of the brew basket. And in still other embodiments, the brew basket 140 may remain stationery in the apparatus 100. The brew basket 140 is generally cup-shaped or frusto-conical and has an upper rim 142 defining an open upper end of the basket through which precursor particulates are loaded into the brew basket. It is contemplated that general construction of the brew basket 140 may be of any suitable construction, such as without limitation, a basket that holds a separate paper or other filter (not shown) into which the precursor particles are loaded, a basket (not shown) that is made in part of a filter material so that precursor particles are loaded directly into the basket, or a basket (not shown) that is itself a replaceable cartridge that holds pre-loaded precursor particles. The brew basket 140 may include a handle (not shown) to facilitate the handling of the brew basket 140 by a user. The brew basket 140 may be constructed from any suitable material, such as metal, glass, ceramic, and/or plastic, that enables the apparatus 100 to function as described herein.

The apparatus 100 further includes a reservoir 170 supported by a platform 195 and in communication with a heating system (not shown) located inside the platform. Alternatively, the heating unit may be located within the reservoir 170 or remotely from the reservoir. It is also contemplated that the reservoir 170 or other suitable source of liquid may be located remotely from the apparatus 100, by itself or along with the heating unit, without departing from the scope of this disclosure. The heating unit may be an electric heating unit such as a CALROD heating unit, or any other suitable heating system that enables the apparatus 100 to function as described herein. The reservoir 170 is in suitable fluid communication with the heating unit to deliver liquid (e.g., water) to the heating unit. The reservoir 170 may have any suitable volume capacity. In some embodiments, the user may manually pour, without limitation, water or some other suitable liquid into the reservoir 170. Alternatively, the reservoir 170 may be connected to a liquid (e.g., water) source whereby liquid is introduced by action of the user, or introduced automatically into the reservoir 170 whenever the watermark therein falls below a predetermined threshold. In some embodiments, the apparatus 100 may be connected to a power outlet (not shown) via a power cord (not shown). Alternatively, or additionally, the apparatus 100 may be powered by a battery (not shown) or by any other power source that enables the apparatus 100 to function as described herein.

Still referring to FIGS. 1 and 2, a container 150 is seated on a base 160, which may be heated to keep the brewed beverage warm or is unheated and simply functions to protect the surface on which the apparatus 100 sits from potential damage. The illustrated base 160 includes a seat 165 inset in the upper surface of the base 160 to facilitate proper alignment and positioning of the container 150 on the base 160. The container 150 may comprise any suitable size and shape, such as for a single serving or multiple servings. While not shown herein, it is understood that the apparatus 100 may further include a housing or other guard structure enclosing all or some of the components of the apparatus. A control panel, display monitor, actuation button, and/or cables for connecting to a power source, etc. may also be included on the apparatus 100.

The apparatus 100 further comprises a liquid delivery system 185 for delivering heated liquid to the precursor particulates disposed in the brew basket 140. In the illustrated embodiment of FIG. 2, the liquid delivery system includes an up-tube (or riser tube) 180 disposed in the reservoir 170 for receiving heated liquid from the reservoir, and a showerhead assembly 120 connected to the up-tube in flow communication therewith for receiving heated liquid from the up-tube and directing the heated liquid onto the precursor particulates in the brew basket 140. As illustrated in FIG. 1, the up-tube 180 includes a suitable elbow 188 that redirects liquid flowing up through the up-tube about a 90-degree bend. The showerhead assembly 120 includes a connector 210 having an open end for connection to the elbow 188 in flow communication therewith to receive liquid from the up-tube into the showerhead assembly. The opposite end of the connector 210 is closed. Various parts of the liquid delivery system 185 may be fabricated from one or more suitable materials that minimize the amount of thermal loss. Specifically, during the process of transporting hot liquid through the liquid delivery system 185, thermal loss of the hot liquid may be related at least in part to the materials that define the surfaces over which the heated liquid flows along the liquid delivery system 185. To minimize the amount of thermal energy transferred from the hot liquid to these surfaces, the amount of surface over which the heated liquid flows before dispensing into the basket should be minimized, while the materials contacted by the heated liquid are still sufficient to withstand the operating temperatures of the apparatus 100. In some embodiments, components of the liquid delivery system 185 are fabricated from polypropylene. Alternatively, another type of material may be used that enables the apparatus 100 to function as described herein.

A showerhead 230 (FIG. 2) of the showerhead assembly 120 is pivotally mounted on the connector 210 in flow communication with the open end of the connector for receiving liquid from the up-tube into the showerhead via the connector. The showerhead 230 in accordance with one embodiment may be connected to the lid of the apparatus 100 for closing off access to the brew basket 140 during operation. The lid is pivotal relative to the apparatus 100 between an opened position, which provides access to the brew basket 140, such as for loading or unloading the filter 130 and precursor particulates into the basket, and a closed position in which access to the brew basket is closed. The showerhead 230 pivots about the connector 210 conjointly with the lid such that when the lid is closed the showerhead is positioned at least in part over the precursor particles.

More particularly, in the illustrated embodiment of FIG. 2 when the lid is closed the showerhead 230 is positioned at least in part above the entire brew basket 140, such as by a predetermined height above the rim 142 of the basket. This height may be any suitable height that enables the apparatus 100 to operate as described herein. For example, the height of the showerhead 230 above the brew basket 140 may be determined such that liquid distributed by the showerhead into the basket reaches the sidewalls of the basket or at least transversely outer portions of the particulates in the basket. It is understood, however, that in other embodiments all or part of the showerhead 230 may be disposed at the level of the rim 142 of the brew basket 140, or even below the rim of the brew basket, as long as the showerhead is disposed above the level of the precursor particulates contained in the brew basket.

Figure 3:
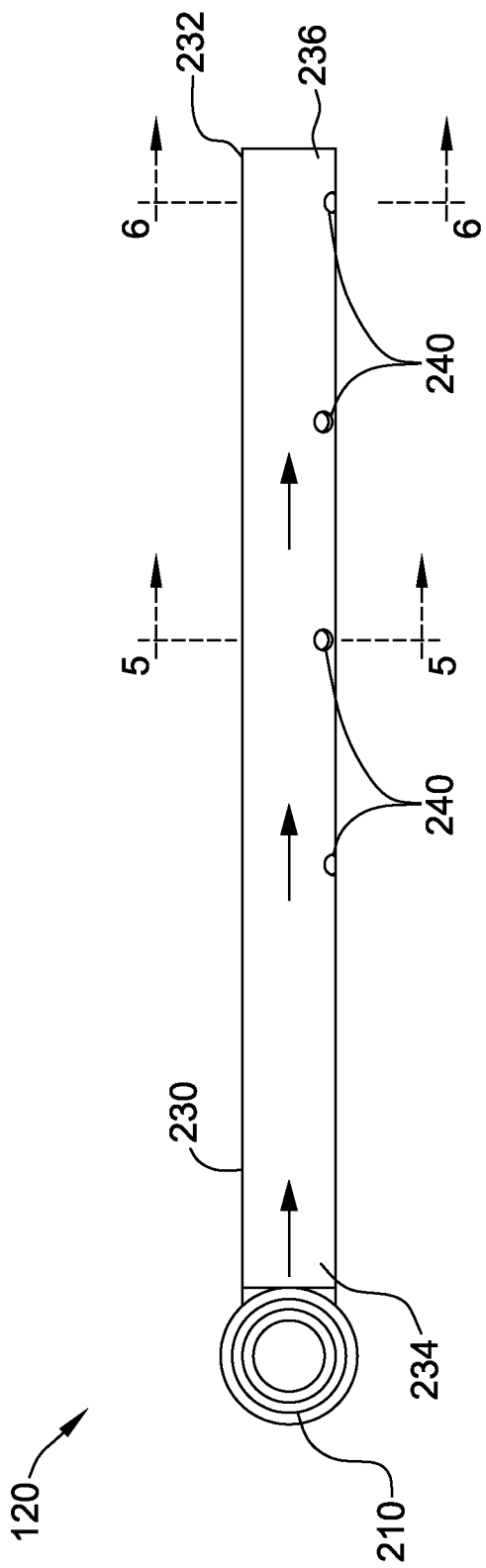
FIG. 3 is a side elevation of a showerhead assembly of the apparatus of FIG. 1.
Figure 4:
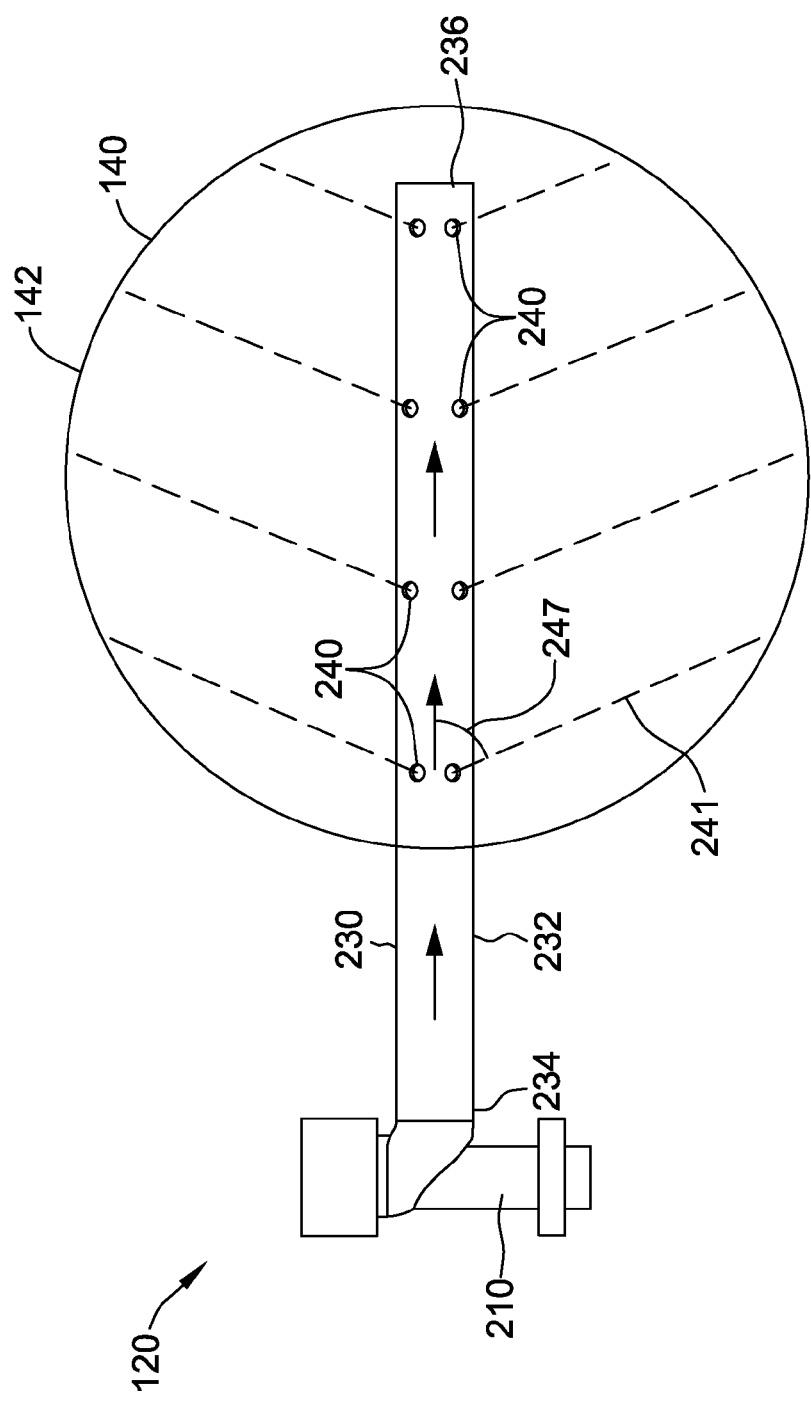
FIG. 4 is a bottom plan view of the showerhead assembly of the apparatus in FIG. 2 with an upper rim of a brew basket of the apparatus being schematically illustrated.

With reference to FIGS. 3 and 4, the showerhead 230 is a generally elongate tube 232 having an open proximal end 234 connected to the connector 210 and a closed distal or free end 236. The tube 232 of the illustrated embodiment is suitably circular in cross-section. In other embodiments, the tube 232 may be of another suitable cross-section such as, without limitation, square, hexagonal, triangular or other suitable shape. The tube 232 according to one embodiment has a length from its proximal end 234 to its distal end 236. The tube 232 also has an average inner cross-sectional area along its length in the range of about 25 mm$^2$ to about 45 mm$^2$ and in one particular embodiment it is about 34 mm$^2$. The relatively small cross-sectional area facilitates a reduced loss of thermal energy as heated liquid flows through the tube 232.

The thickness of the tube 232, and hence an outer surface area of the tube may vary over its length from the proximal end 234 to the distal end 236 thereof. The outer surface area is thus determined as the average outer circumference of the tube 232 multiplied by the length of the tube. In one embodiment, the outer surface area of the tube 232 is in the range of about 3,000 mm$^2$ to about 3,500 mm$^2$, and in one particular embodiment it is about 3,335 mm$^2$. This also provides a relatively low mass of the showerhead, i.e., the tube 232. For example, in the illustrated embodiment the mass of the tube 232 along its length is about 3 grams. A relatively lower mass of the tube 232 facilitates a reduced loss of thermal energy as heated liquid flows through the tube.

As seen best in FIG. 4, a plurality of outlet openings 240 are formed in the tube 232 intermediate the proximal and the distal ends 234, 236 of the tube. In the illustrated embodiment, eight such outlet openings 240 are formed in the tube 232, and more particularly four pairs of outlet openings are formed in the tube with each pair of outlet openings being spaced longitudinally from the other pairs of outlet openings. A flow direction of liquid through the tube 232 is indicated by the direction arrow in FIG. 4 and is generally from the proximal end 234 of the tube toward the distal end 236. It is understood that the tube 232 may have more than eight outlet openings, or less than eight outlet openings, and remain within the scope of this disclosure.

Figure 5:
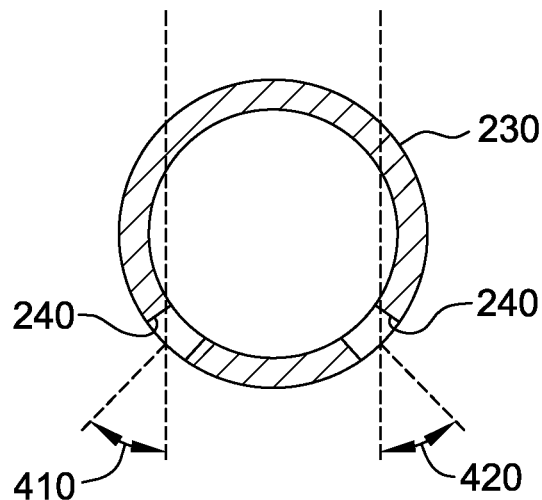
FIG. 5 is a cross-section taken in the plane of line 5-5 of FIG. 3.
Figure 6:
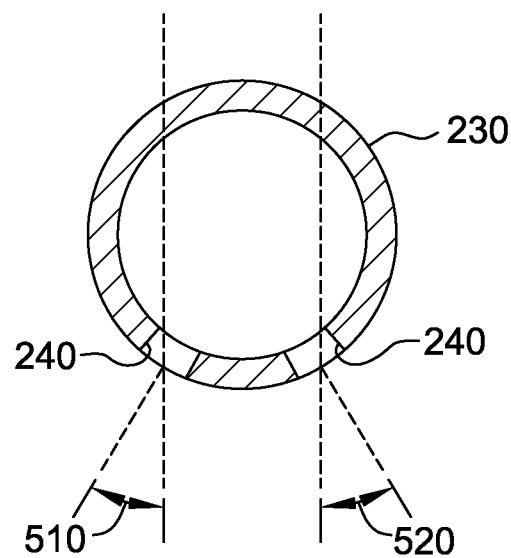
FIG. 6 is a cross-section taken in the plane of line 6-6 of FIG. 3.

As illustrated in FIG. 4, each pair of outlet openings 240 is arranged with one outlet opening located on one side of a vertical centerline of the tube 232 and the other outlet located on the opposite side of the vertical centerline of the tube. The circumferential or angular spacing between the two outlet openings 240 may vary among the different pairs of outlet openings as in the embodiment of FIG. 4, or the spacing may be the same for each pair of outlet openings. For example, in the illustrated embodiment the first and last pairs of outlet openings 240 along the flow direction of liquid through the tube 232 is configured with the openings relatively closer together than the middle two pairs of outlet openings. This arrangement accounts for the transverse spacing between the tube 232 and the sidewall of brew basket being smaller where the first and last pairs of the outlet openings 240 are located when the tube 232 spans the basket 140. Cross-sections of the tube at one of the middle pair of outlet openings 240 and at the last pair of outlet openings are illustrated in FIGS. 5 and 6, respectively. The outlet openings 240 of FIG. 5 are located on the tube 232 at respective angles 410, 420 relative to vertical of −45 degrees and 45 degrees, while the outlet openings of FIG. 6 are located on the tube at respective angles 510, 520 relative to vertical of −30 degrees and 30 degrees. However, the angular locations of the outlet openings 240 in the tube 232 may be other than as illustrated, such as any suitably angle 410, 420, 510, 520 less than about 90 agrees relative to vertical, more suitably in the range of about 10 degrees to 80 degrees, even more suitably about 15 degrees to about 60 degrees, and still more suitably about 30 degrees to about 45 degrees.

The outlet openings 240 illustrated in FIGS. 3 and 4 are suitably circular. In alternative embodiments, one or more of the outlet openings 240 may be other than circular, such as hexagonal, oval, triangular or any other shape that enables the apparatus 100 to function as described herein. The outlet openings 240 are suitably sized in cross-section to inhibit mineral or residue build-up at the openings. For example, in one embodiment the outlet openings 240 may each have a diameter in a range of about 0.01 inches to about 0.50 inches (in.); more suitably about 0.05 in. to about 0.40 in.; even more suitably about 0.10 in. to about 0.30 in; and yet more suitably about 0.11 in. to about 0.20 in.

FIG. 4 illustrates the showerhead 230 with the tube 232 positioned above the upper rim 142 of the brew basket 140. The view of FIG. 4 is thus looking upward at the rim 142 of the basket, with the rim shown schematically and the rest of the brew basket omitted. While the illustrated brew basket 140 is generally circular in cross-section, it is understood that in other embodiments the brew basket may be shaped in cross-section as a square, ellipse, triangle or other suitable shape and remain within the scope of this disclosure. The tube 232 as seen in FIG. 4 is suitably sized in length such that at least the extent of the tube having the outlet openings 240 spans diametrically across a substantial portion of the brew basket 140. While in the illustrated embodiment the closed distal end of the tube 232 is disposed above the brew basket 140, it is contemplated that in other embodiments the distal end of the tube may be disposed beyond the brew basket 140 as long as the outlet openings are positioned relative to the brew basket to direct liquid onto the precursor particulates in the brew basket.

The tube 232 is sized in length and positioned above the brew basket 140 such that, in the flow direction of liquid through the tube 232, the first pair of outlet openings is nearer to the sidewall of the brew basket 140 than the last pair of outlet openings. This arrangement accounts for the forward velocity of liquid that exits the outlet openings in the flow direction. For example, as illustrated in FIG. 4 by the dashed exit flow paths 241, liquid exiting the outlet openings 240 has some tendency to continue in part in the flow direction of the liquid. Accordingly, the outlet openings 240 are thus located along the tube 232 relative to the brew basket so as to be generally upstream of the desired reach of the liquid into the brew basket. In other embodiments, the outlet openings 240 may be located along the tube 232 relative to the brew basket 140 in a more uniform spacing across the extent of the brew basket.

In operation of the apparatus 100, the heating unit 190 receives liquid from the reservoir 170 and heats the liquid to a boil, thus generating bubbles, which increase and become more excited as the temperature inside the heating unit rises. The bubbling creates an expansion of volume that forces liquid upward through the up-tube 180 to the showerhead assembly 120. The heated liquid flows into the showerhead assembly 120 and more particularly through the tube 232 in the flow direction toward the distal end of the tube. The liquid exits the tube 232 through the outlet openings 240 into the brew basket 140 and onto the precursor particulates. Because the outlet openings 240 are angled relative to vertical, the liquid generally flows outward of the outlet openings other than vertically downward. It is understood, however, that one or more downward facing outlet openings may also be included in the tube to allow some of the liquid to exit the tube 232 vertically downward.

During a brewing cycle, liquid is delivered from the heating unit up through the up-tube 180 to the showerhead assembly 120 generally in pulses. That is, as heated liquid flows from the heating unit to the showerhead assembly 120, cooler liquid from the reservoir 170 flows into the heating unit. Thus, there is a slight delay in the flow of additional heated liquid from the heating unit to the showerhead assembly as the cooler liquid is heated. This results in the liquid being delivered to the showerhead assembly 120 in what appears to be pulses of liquid. These pulses may vary in pressure, volume and/or flow rate to the showerhead assembly. For pulses that are lower in pressure, volume and/or flow rate, the heated liquid flows less forcefully or rapidly into the showerhead 230 and thus out of the outlet openings 240. As a result, the heated liquid does not flow very far outward away from the tube, and in some instances it may dribble generally downward over the tube below the outlet openings 240 and then fall downward onto the precursor particulates. For pulses that are higher in pressure, volume and/or flow rate, the heated liquid flows more forcefully or rapidly into the showerhead 230 and upon exiting the outlet openings 240 of the tube 232 the liquid flows (e.g., at least in part transversely) outward away from the tube such as illustrated in FIG. 4. Thus, over the course of a brewing cycle, the precursor particulates are more uniformly wet with heated liquid.

Figure 7:
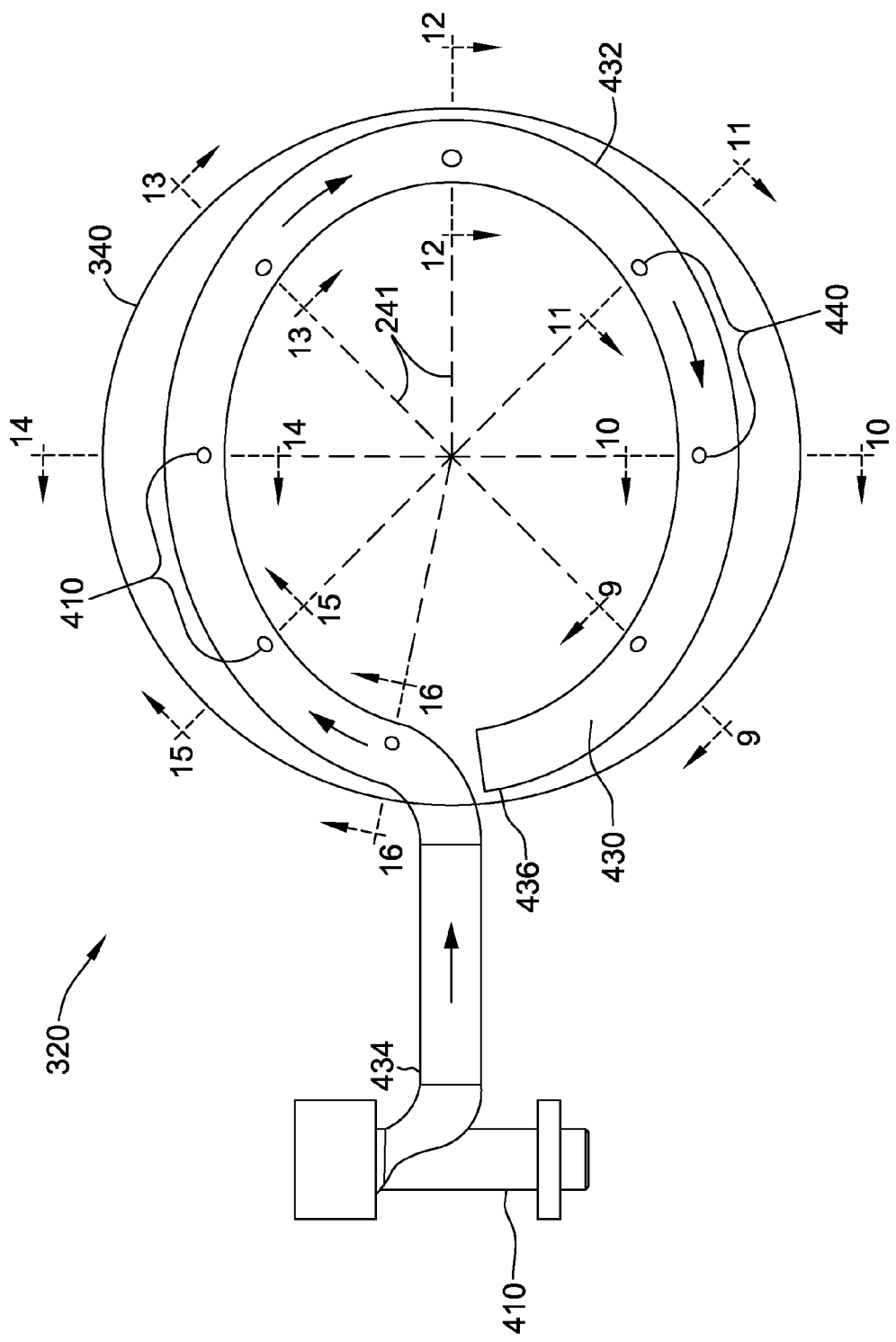
FIG. 7 is a bottom plan view a second embodiment of showerhead assembly for use with the apparatus of FIG. 2.
Figure 8:
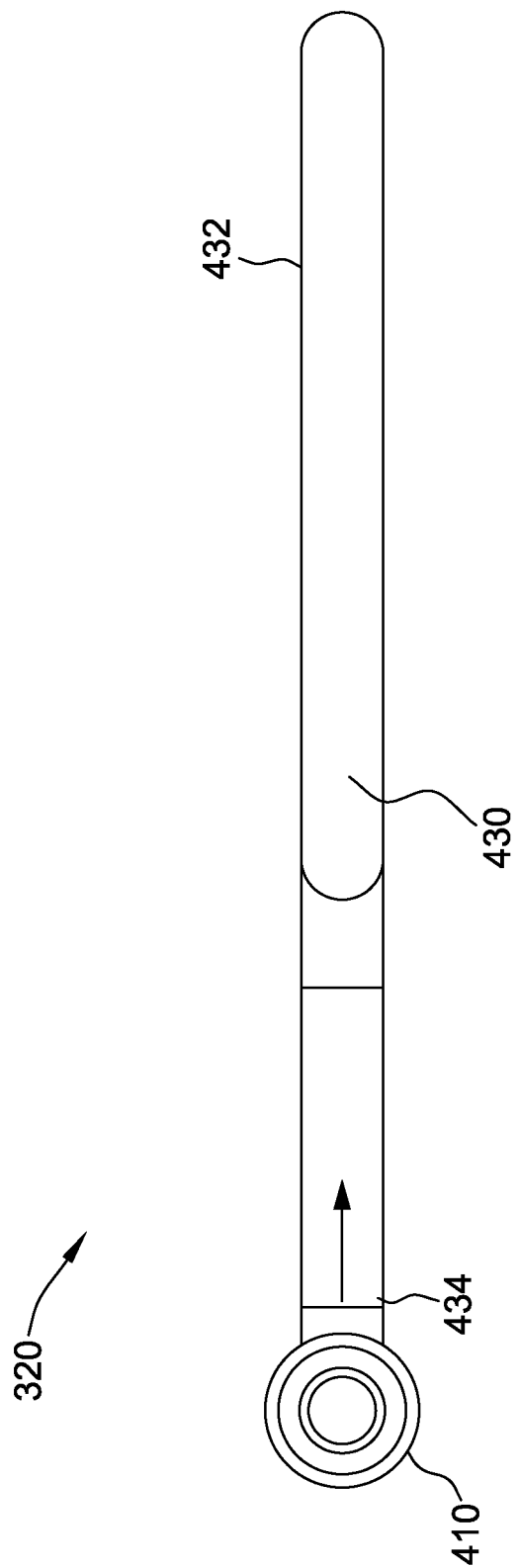
FIG. 8 is a side elevation of the showerhead assembly of FIG. 7.
Figure 9:
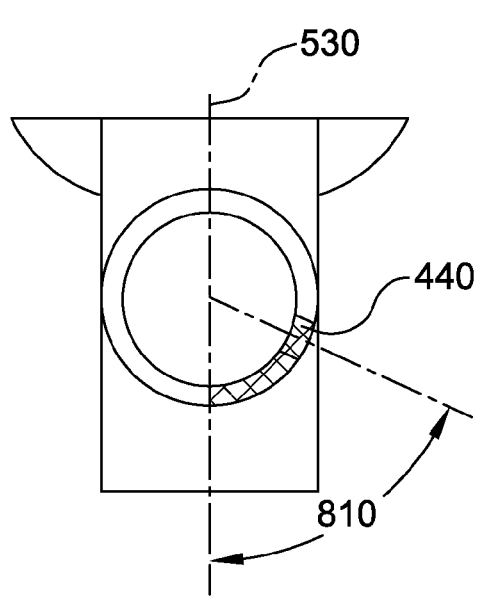
FIG. 9 is a cross-section taken in the plane of line 9-9 of FIG. 7.

FIGS. 7 and 8 illustrate another embodiment of a showerhead assembly 320 suitable for use with the apparatus 100 of FIG. 1 or other suitable brewing apparatus. The showerhead assembly 320 is similar to the showerhead assembly 120 of FIGS. 3-6 in comprising a connector 410 and showerhead 430 that is a generally elongate tube 432 having an open proximal end 434 connected to the connector 410 and a closed distal or free end 436. The tube 432 is suitably circular in cross-section. In other embodiments the tube 432 may be of another suitable cross-section such as, without limitation, square, hexagonal, triangular or other suitable shape. In this embodiment, the showerhead 430 is configured as a loop to extend generally in accordance with the circumference of the brew basket 340. In the illustrated embodiment of FIG. 7, the loop shape of the showerhead 430 is generally oval or elliptical. In other embodiments the loop shape of the showerhead 430 may be circular, hexagonal or other suitable shape and remain within the scope of this disclosure.

With continued reference to FIG. 7, a plurality of outlet openings 440 are formed in the tube 432 in spaced relationship with each other along the circumference of the loop segment of the tube. In the illustrated embodiment, eight such outlet openings 440 are formed in the tube 432. A flow direction of liquid through the tube 432 is indicated by the direction arrow in FIG. 7 and is generally from the proximal end 434 of the tube toward the distal end 436. It is understood that the tube 432 may have more than eight outlet openings, or less than eight outlet openings, and remain within the scope of this disclosure. The outlet openings 440 are illustrated as being equally spaced along the circumference of the tube 432. In other embodiments, however, the spacing being outlet openings 440 may be non-uniform without departing from the scope of this disclosure.

Figure 10:
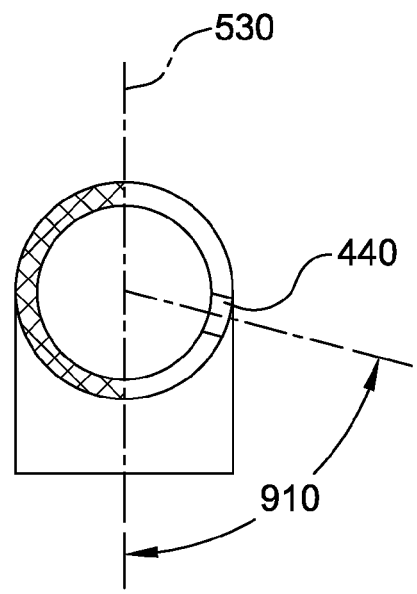
FIG. 10 is a cross-section taken in the plane of line 10-10 of FIG. 7.
Figure 11:
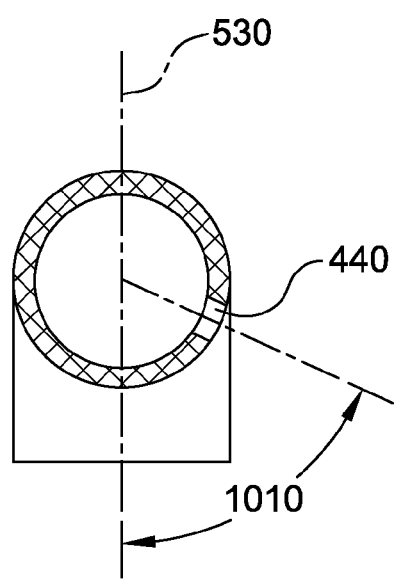
FIG. 11 is a cross-section taken in the plane of line 11-11 of FIG. 7.
Figure 12:
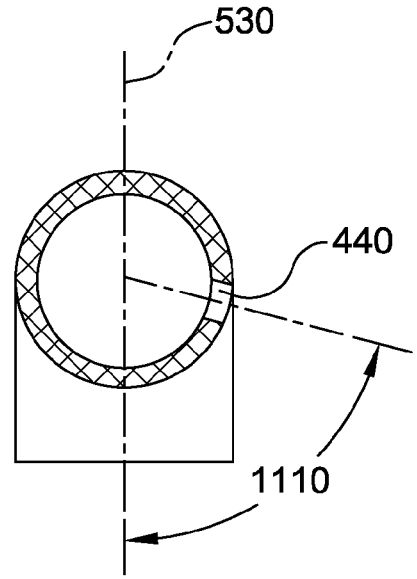
FIG. 12 is a cross-section taken in the plane of line 12-12 of FIG. 7.
Figure 13:
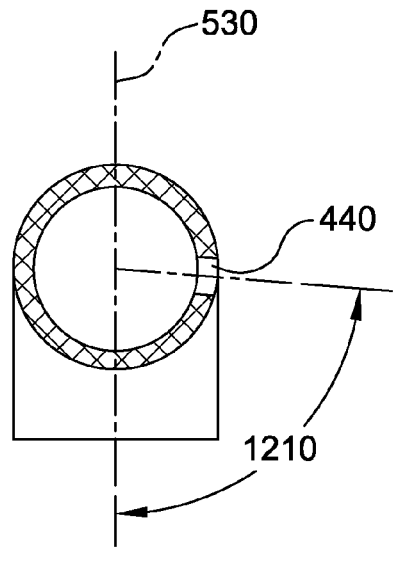
FIG. 13 is a cross-section taken in the plane of line 13-13 of FIG. 7.
Figure 14:
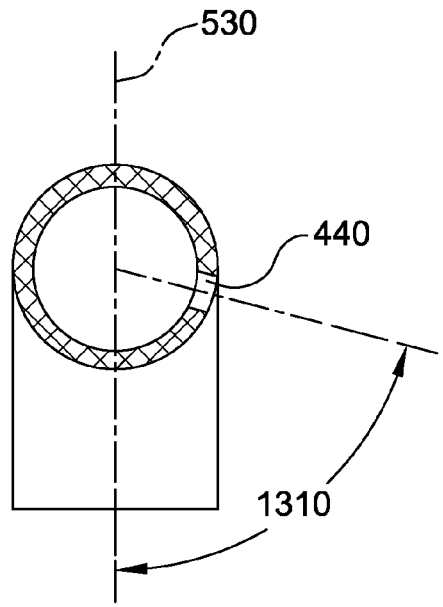
FIG. 14 is a cross-section taken in the plane of line 14-14 of FIG. 7.
Figure 15:
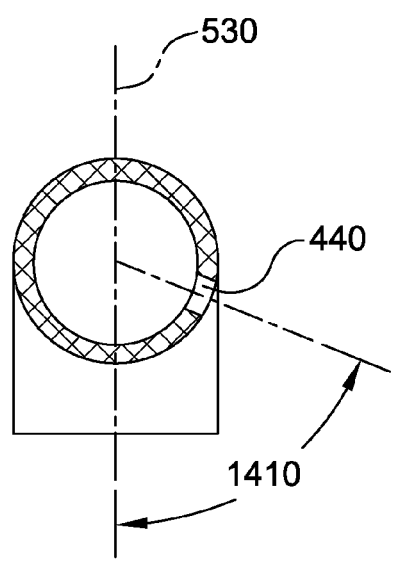
FIG. 15 is a cross-section taken in the plane of line 15-15 of FIG. 7.
Figure 16:
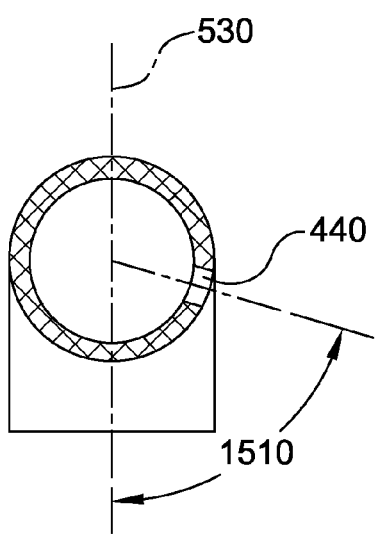
FIG. 16 is a cross-section taken in the plane of line 16-16 of FIG. 7.

In this embodiment, the outlet openings 440 are each located on the inner side of a vertical centerline of the tube, e.g., so as to be angled in part transversely inward of the brew basket. FIGS. 9-16 are cross-sections taken through the tube 432 at the location of each respective outlet opening 440 along the flow direction of liquid through the tube. The angle of each respective outlet opening 440 relative to vertical can vary among the outlet openings, as in the illustrated embodiment. For example, In FIGS. 9 and 11 the respective outlet opening 440 is located at an angle 810, 1010 of 65.4 degrees relative to the vertical centerline 530. In FIGS. 10, 12 and 14 the respective outlet opening 440 is located at an angle 910, 1110, 1310 of 75.3 degrees relative to the vertical centerline 530. In FIG. 13, the outlet opening 440 is located at an angle 1210 85.4 degrees relative to the vertical centerline 530. In FIG. 15 the outlet opening 440 is located at an angle 1410 of 68.0 degrees relative to the vertical centerline 530. And in FIG. 16 the outlet opening 440 is located at an angle 1510 of 73.6 degrees relative to the vertical centerline 530. However, the angular locations of the outlet openings 440 in the tube 432 may be other than as illustrated, such as any suitably angle less than about 90 agrees relative to vertical.

In operation, during a brewing cycle, liquid is delivered from the heating unit up through the up-tube 180 to the showerhead 430 generally in pulses. That is, as heated liquid flows from the heating unit to the showerhead 430, cooler liquid from the reservoir 170 flows into the heating unit. Thus, there is a slight delay in the flow of additional heated liquid from the heating unit to the showerhead 430 as the cooler liquid is heated. This results in the liquid being delivered to the showerhead 430 in what appears to be pulses of liquid. These pulses may vary in pressure, volume and/or flow rate to the showerhead assembly. For pulses that are lower in pressure, volume and/or flow rate, the heated liquid flows less forcefully or rapidly into the showerhead 430 and thus out of the outlet openings 440. As a result, the heated liquid does not flow very far outward away from the tube, and in some instances it may dribble generally downward over the tube below the outlet openings 440 and then fall downward onto the precursor particulates. For pulses that are higher in pressure, volume and/or flow rate, the heated liquid flows more forcefully or rapidly into the showerhead 430 and upon exiting the outlet openings 440 of the tube 432 the liquid flows (e.g., at least in part transversely) outward away from the tube as illustrated by the dashed line flow paths in FIG. 7. Thus, over the course of a brewing cycle, the precursor particulates are more uniformly wet with heated liquid. Because the outlet openings 440 are angled relative to vertical, the liquid generally flows outward of the outlet openings 440 other than vertically downward, and more particularly inward toward the center of the brew basket 340. It is understood, however, that one or more downward facing outlet openings 440 may also be included in the tube 432 to allow some of the liquid to exit the tube vertically downward onto the precursor particulates.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus and methods without departing from the scope of the disclosure, it is intended that all matter contained in the above description and shown in the accompanying figures shall be interpreted as illustrative and not in a limiting sense.

What is claimed is:

1. A beverage brewing apparatus for brewing a beverage from precursor particulates, the apparatus comprising:
    a brewing basket configured to receive precursor particulates therein; and
    a liquid delivery system for delivering liquid into the brewing basket, the liquid delivery system comprising a showerhead disposed above and extending transversely over at least a portion of the brewing basket, the showerhead comprising a tube having an inlet end at which liquid is received into the showerhead and a distal end such that liquid flows in a flow direction through the tube from the inlet end toward the distal end, the tube having at least a tube portion thereof extending over the brewing basket and that tube portion having a plurality of outlet openings provided along the tube portion and intermediate the inlet end and the distal end of the tube in spaced relationship with each other along the flow direction of liquid through the tube, at least a first of the outlet openings being located on one side of a vertical centerline of the tube as the tube is viewed in transverse cross-section and oriented at an angle to the vertical centerline such that liquid exits the at least one of the outlet openings at least in part transversely of the brewing basket and at least in part vertically of the brewing basket.

2. The apparatus of claim 1 wherein the at least the first of the outlet openings is disposed in the tube at an angle relative to vertical in the range of about 15 degrees to about 60 degrees.

3. The apparatus of claim 2 wherein the at least the first of the outlet openings is disposed in the tube at an angle relative to vertical in the range of about 30 degrees to about 45 degrees.

4. The apparatus of claim 2 wherein a plurality of the outlet openings are disposed in the tube such that liquid exits the outlet openings other than straight downward from the tube, the plurality of openings including at least a second opening that is located on another side of the vertical centerline of the tube than the first opening.

5. The apparatus of claim 4, wherein the outlet openings are provided in pairs along the tube portion with the first outlet opening on the one side of the vertical centerline along with its pair opening on the other side of the vertical centerline and the second outlet opening on the other side of the vertical centerline and its pair opening on the one side of the vertical centerline.

6. The apparatus of claim 5, wherein the pair of outlet openings including the first outlet opening are oriented to direct the flow of liquid out of the showerhead at a first angle relative to vertical from the vertical centerline, respectively, and the pair of outlet openings including the second outlet opening are oriented to direct the flow of liquid out of the showerhead at a second angle relative to vertical from the vertical centerline, respectively, that is different than the first angle.

7. A beverage brewing apparatus for brewing a beverage from precursor particulates, the apparatus comprising:
    a brewing basket configured to receive precursor particulates therein; and
    a liquid delivery system for delivering liquid into the brewing basket, the liquid delivery system comprising a showerhead disposed above and extending transversely over at least a portion of the brewing basket, the showerhead comprising a tube having an inlet end at which liquid is received into the showerhead and a distal end such that liquid flows in a flow direction through the tube from the inlet end toward the distal end, the tube having at least a tube portion thereof extending over the brewing basket and that tube portion having a plurality of outlet openings provided intermediate the inlet end and the distal end of the tube in spaced relationship with each other along the flow direction of liquid through the tube, the plurality of outlet openings facilitating liquid flow outward from the showerhead into the brew basket, the plurality of outlet openings including a first outlet opening located on one side of a vertical centerline of the tube as the tube is viewed in transverse cross-section and oriented at a first angle relative to vertical and a second outlet opening located at a second angle relative to vertical that is different than the first angle, the plural outlet openings being oriented to direct the flow of liquid out of the showerhead at least in part transversely of the brew basket.

8. The apparatus of claim 7 wherein at least one of the outlet openings is oriented to direct the flow of liquid out of the showerhead at an angle relative to vertically down in the range of about 15 degrees to about 60 degrees.

9. The apparatus of claim 8 wherein the at least one of the outlet openings is oriented to direct the flow of liquid out of the showerhead at an angle relative to vertically down in the range of about 30 degrees to about 45 degrees.

10. The apparatus of claim 8 wherein at least one other one of the outlet openings oriented to direct the flow of liquid out of the showerhead at an angle relative to vertically down in the range of about −15 degrees to about −60 degrees.

11. The apparatus of claim 7 wherein the tube portion is a generally straight tube.

12. The apparatus of claim 7 wherein the tube portion is at least in part arcuate along a segment thereof.

13. The apparatus of claim 12 wherein the tube portion is generally loop-shaped from the inlet end to the distal end of the tube.

14. The apparatus of claim 7, wherein the outlet openings are provided in pairs along the tube portion with the first outlet opening on the one side of the vertical centerline along with its pair opening on the other side of the vertical centerline and the second outlet opening on the other side of the vertical centerline and its pair opening on the one side of the vertical centerline.

15. The apparatus of claim 14, wherein the pair of outlet openings including the first outlet opening are oriented to direct the flow of liquid out of the showerhead at a first angle relative to vertical from the vertical centerline, respectively, and the pair of outlet openings including the second outlet opening are oriented to direct the flow of liquid out of the showerhead at a second angle relative to vertical from the vertical centerline, respectively, that is different than the first angle.

16. A beverage brewing apparatus for brewing a beverage from precursor particulates, the apparatus comprising:
    a brewing basket configured to receive precursor particulates therein; and
    a liquid delivery system for delivering liquid into the brewing basket, the liquid delivery system comprising a showerhead disposed above and extending transversely over at least a portion of the brewing basket, the showerhead comprising a tube having an inlet end at which liquid is received into the showerhead and a distal end such that liquid flows in a flow direction through the tube from the inlet end toward the distal end, the tube having at least a tube portion thereof extending over the brewing basket and that tube portion having a plurality of outlet openings provided along the tube portion and intermediate the inlet end and the distal end of the tube in spaced relationship with each other along the flow direction of liquid through the tube, wherein at least two of the outlet openings are arranged linearly in the flow direction and at least one of the outlet openings being located on one side of a vertical centerline of the tube as the tube is viewed in transverse cross-section and oriented at an angle to the vertical centerline such that liquid exits the at least one of the outlet openings at least in part transversely of the brewing basket.

* * * * *